B. K. & T. BROWN.
PROCESS OF PRODUCING KINEMATOGRAPH FILMS.
APPLICATION FILED NOV. 8, 1907.

1,034,192.

Patented July 30, 1912.

WITNESSES
L. H. Grote
M. E. Keir

INVENTORS
Bessie Kate Brown
Theodore Brown
by Howson and Howson
attys

B. K. & T. BROWN.
PROCESS OF PRODUCING KINEMATOGRAPH FILMS.
APPLICATION FILED NOV. 8, 1907.

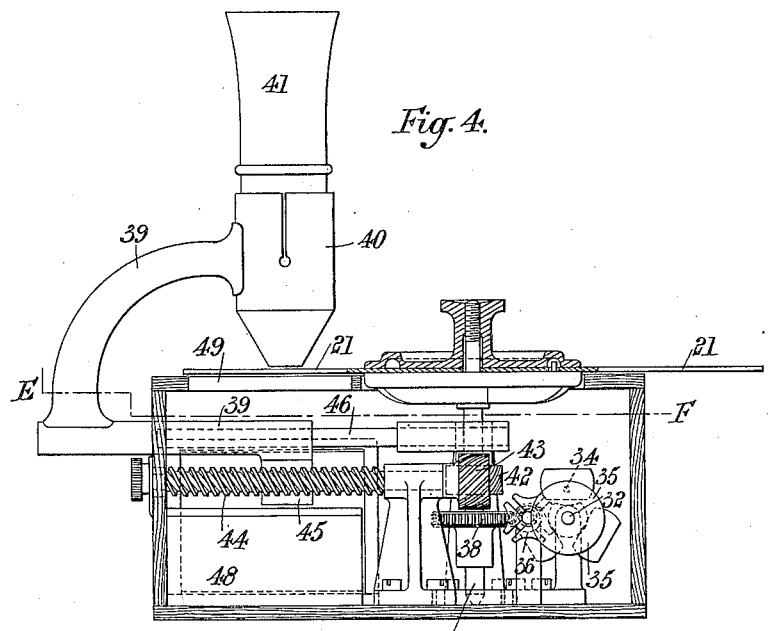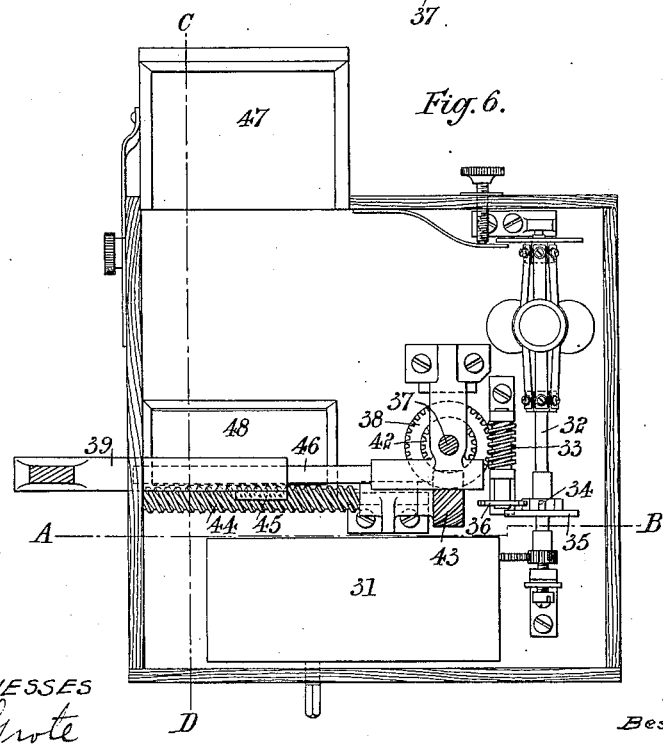

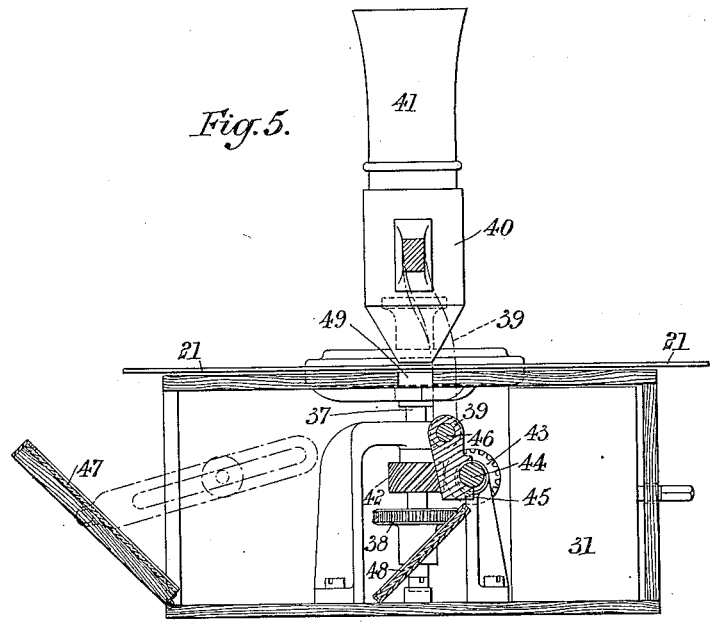

UNITED STATES PATENT OFFICE.

BESSIE KATE BROWN AND THEODORE BROWN, OF BRIXTON, LONDON, ENGLAND, ASSIGNORS TO CHARLES URBAN, OF LONDON, ENGLAND.

PROCESS OF PRODUCING KINEMATOGRAPH-FILMS.

1,034,192.  Specification of Letters Patent.  Patented July 30, 1912.

Application filed November 8, 1907. Serial No. 401,261.

*To all whom it may concern:*

Be it known that we, BESSIE KATE BROWN, lady, a subject of the King of Great Britain and Ireland, and THEODORE BROWN, editor, a subject of the King of Great Britain and Ireland, both of 8 Villa road, Brixton, London, England, and whose post-office address is 8 Villa road, Brixton, London, S. W., have invented new and useful Improvements in Processes of Producing Kinematograph-Films, of which the following is a specification.

This invention relates to the production of photographic images of reduced magnitude from ordinary kinematograph film pictures, and the said reduced images being received upon suitable sensitive medium in series corresponding approximately with any series of pictures on an ordinary kinematograph film, and the said reduced pictures, or prints therefrom, being more especially adapted for use in a small exhibiting apparatus for direct vision by individuals, although they may be used for exhibition by projection on a screen. Provision is made for photographing the said reduced images in series from ordinary kinematograph films so as to form either a spiral series, or in two, or more, spiral series, or a series in a ring, or in series in concentric rings. Several entirely different subjects may follow each other in any one series of pictures, when arranged in spiral order; or when the pictures are arranged in rings, or in two, or more, spiral series, each ring, or spiral, may be occupied by pictures devoted to one subject only, or one subject may be continued throughout all the rings, or spirals, or any required number, or portion, of them.

The method of obtaining the aforesaid reduced kinematographic pictures according to this invention is indirect, they not being photographed direct from nature, but being photographed on a reduced scale, from either negative, or positive, images, previously taken by an ordinary kinematograph camera, or by means of the standard film printer. To effect this, an ordinary kinematograph picture film is passed through an ordinary kinematograph projector and lantern, or kinematograph camera, and at a suitable distance from the said kinematograph projector, and lantern, or kinematograph camera, is mounted a microscope, with the eye-piece thereof facing the gate of the kinematograph projector and lantern, or kinematograph camera, and with its optical axis in a line with the center of each picture, and at right angles thereto, when it is presented to be copied. At the opposite end of the microscope, and near to the objective lens thereof, is situated the sensitized plate, or film, upon which the reduced pictures are to be received. The reduced pictures are preferably obtained on the said plate, or film, in the form of a spiral series by intermittently revolving the plate, or film, one picture space forward, and at the same time moving it radially; such movement being made while the projecting illuminant, or the day-light, is shut off from the microscope, by the intervening shutter of the kinematograph. While the said movement of the disk is being accomplished, the corresponding movement of the ordinary kinematograph film through the kinematograph projector and lantern, or kinematograph camera, is also accomplished.

To obtain the series of reduced pictures in the form of concentric rings, instead of a spiral, the disk is moved radially only upon the completion of each ring of pictures. The sensitive emulsion upon which the reduced images are photographed, is of a structureless nature, such, for instance, as collodion emulsion, or the emulsions employed for process plates, or films. This invention therefore especially consists in utilizing any ordinary negative, or positive, series of kinematograph pictures as originals from which to make reduced copies upon an emulsion, such as those aforesaid, which emulsions are of a character adapted to receive the details of the reduced pictures, but which, on account of their being but slowly affected by light, are not adapted for use in photographing moving subjects direct from nature. Thus, although the ordinary kinematograph film pictures from which the reduced copies are made, may consist of a series taken at the usual rate of say sixteen pictures every one second of time, in taking the reduced pictures according to this invention, the time during which each of such pictures in a series is allowed to remain stationary for the purpose of copying it onto the plate, or film, sensitized with an emulsion of the character aforesaid, can be prolonged to the requisite extent. The reduced pictures thus form records, which, or (if they be negatives) positives taken therefrom, can be viewed through a microscope, or projected onto a screen, while each successive picture in a series is, by suitable mechanical means, brought into its proper position for exhibition, the speed at which the successive pictures are presented to the observer corresponding approximately with the speed at which the original kinematograph pictures were photographed.

We will now describe apparatus adapted for the purposes of this invention, premising that we do not limit ourselves to the precise constructions illustrated.

Figure 1 is a plan of apparatus adapted for taking the reduced series of copies of pictures from a series of ordinary kinematograph pictures.

Rotary motion is imparted by any suitable means (such as a band passing over the pulley 2) to a shaft 1, which motion is transmitted by bevel wheels 3 and 4 to a shaft 5 carrying a crank 6, which brings the ordinary kinematograph pictures on the film 7 successively in front of the lens of the projector, or camera, 8. The said shaft 1 also drives, through the bevel wheels 9 and 10, the shaft 11, having in it a slot 12, with which engages a pin 13, carried by a boss 14, provided with a disk 15 carrying a pin 16, which engages with a notch of the Maltese cross 17 secured to the worm-shaft 18, so as to impart motion of partial rotation at the requisite times (corresponding to the operation of the crank 6 on the film 7) through the worm-wheel 19 to the shaft 20, carrying the sensitized plate, or film, 21, between which, and the optical axis of the projector, or camera, 8 is mounted a microscope 22.

The shaft 20 is mounted in bearings on a carriage 23, running on rails, or rods, 24, and longitudinally moved intermittently by a worm-wheel 25, on the shaft 20, engaging a similar wheel 26, secured to a screw 27. One end of the screw 27 passes through a nut 28 in the frame of the apparatus and a part 29 of the screw 27 engages in a recess in the projection, or bearing, 30, so that the carriage 23 moves longitudinally on the rails, or rods, 24, when the screw 27 is rotated. The slotted connection of the boss 14 with the shaft 11 enables the said boss to follow the table in its motion to maintain the driving position of the pin 16 and Maltese cross 17.

The combined radial and rotary movement of the plate, or film, 21, effected as aforesaid before each successive copy is taken thereon, causes the reduced pictures to be taken in a spiral series on the said plate, or film. Thus, from ordinary kinematograph negative, or positive films, reduced negative, or positive, pictures can be taken upon glass, or any other suitable material, and with any time of exposure required by the particular sensitizing material used, which is of a character adapted to receive the very fine details of the reduced pictures, whereas the sensitized material necessary for the very rapid exposures in taking photographs direct from moving objects is of a grain, or character, not adapted to receive such fine details.

The plate, or film, 21 is, of course, inclosed in a casing, or otherwise protected from access of actinic rays, except those which pass through the microscope 22.

Figs. 4, 5 and 6 are views showing a construction of apparatus adapted to exhibit kinematograph pictures taken as aforesaid or usually positives taken from negative pictures produced as aforesaid, Fig. 4 being a longitudinal sectional elevation on the line A B Fig. 6, Fig. 5 a transverse sectional elevation on the line C D Fig. 6, and Fig. 6 a horizontal section on the line E F Fig. 4.

Figure 1:
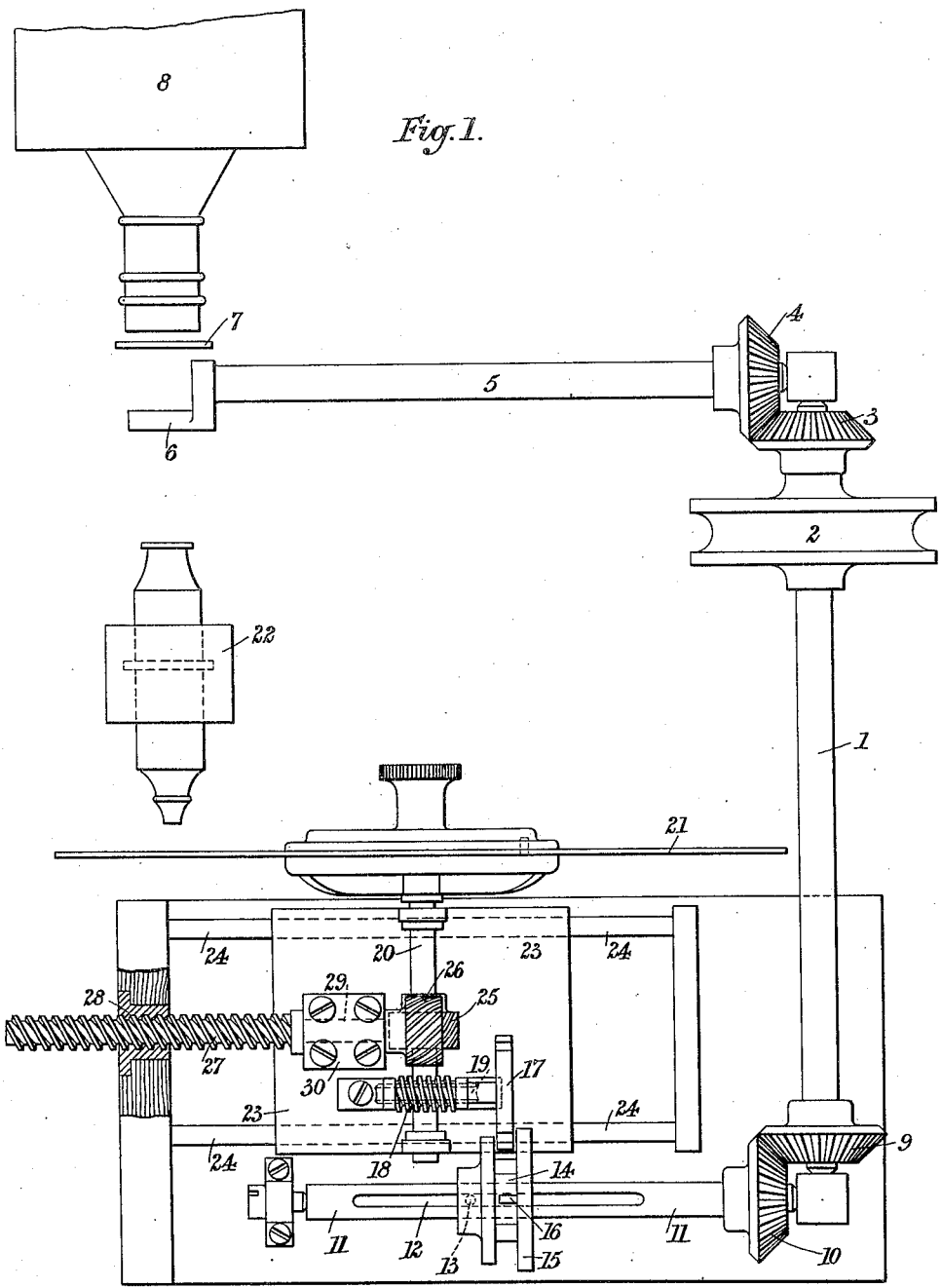
Figure 2:
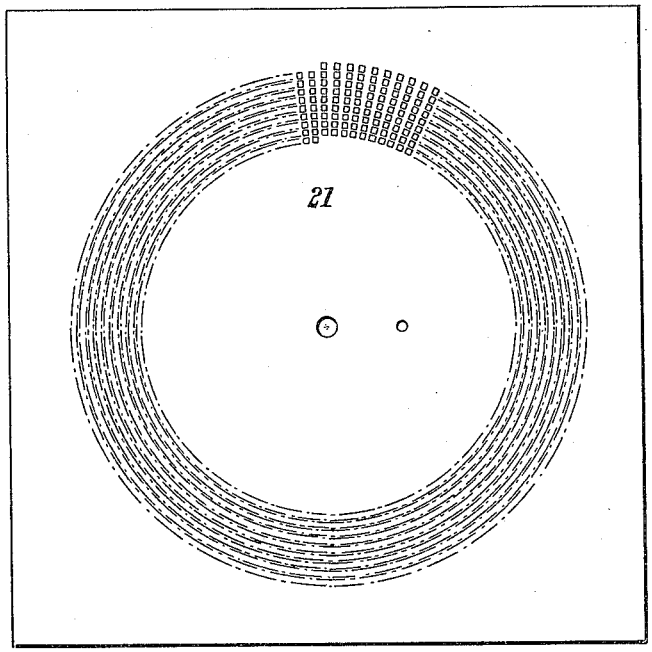
Fig. 2 is a face view of a plate, or film, having the reduced photographs in a spiral form.
Figure 3:
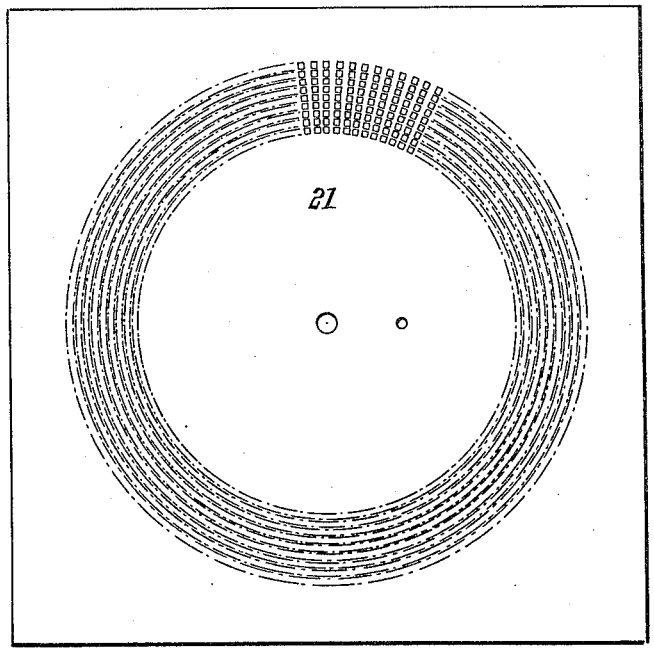
Fig. 3 shows a plate, or film, with the reduced photographs in concentric rings, which will, of course, be produced by imparting radial movement to the disk carrier only after each circle of photographs is completed. The plates, or films, are shown square and are presumed to be negatives, from which positives will be printed, and these positives can be cut into disk form.

We explain this exhibiting apparatus in order to show a means by which our invention can be utilized in exhibiting, although this exhibiting apparatus is not claimed in the present application.

Rotary motion is imparted, from clockwork mechanism contained in the casing 31, to the shaft 32 (shown as being provided with a governor and brake for regulating the speed) and from this intermittent motion of partial rotation is transmitted to a worm-shaft 33, by means of a pin 34, on a disk 35, secured to the shaft 32, the said pin engaging at each rotation a notch in the Maltese cross 36 secured to the worm-shaft 33. This intermittent motion of partial rotation is transmitted from the worm 33 to the shaft 37 by the worm-wheel 38. The shaft 37 carries the disk 21 of reduced pictures in any suitable way. An arm, or bracket, 39 carrier, in a socket 40, a microscope 41, which is caused to intermittently move longitudinally (as each picture on the disk is presented) by means of a worm-wheel 42, fixed to the vertical spindle 37 and engaging with a similar wheel 43, secured on the end of a screw 44, with which engages a nut, or preferably a half nut, 45, secured to the bracket, or arm, 39. The said bracket, or arm, is mounted on a guide-rod 46, upon which it can slide, and, if a half nut be used at 45, the said bracket, or arm, can be turned to fold the said arm down (or it can be detached from the apparatus) for packing. A mirror 47, or mirrors, may be employed for directing light through an opening in the casing to another mirror 48, or mirrors, from which the light is directed through an aperture 49 to the underside of the disk 21. The mirrors are shown flat, but they may be of any other desired shape such, for instance, as to condense the light onto the pictures.

In order that the pictures may be satisfactorily reproduced, the pitch of the screws 27, and 44, the pitch of the worms 18, and 33, and the pitch of the worm-wheels 19, and 38, and their engaging gears respectively, should be identical both in the taking and exhibiting apparatus.

If the pictures on the disk 21 be arranged in concentric rings, instead of in a spiral, or in spirals, the radial movements of the microscope will of course be made to take place only after each series of pictures forming a ring has been exhibited.

When the pictures are in a ring, they may be viewed repeatedly, the subject of course being repeated at each revolution of the ring.

It will be understood that two, or more, series of pictures may be arranged spirally on the plate, or film, instead of in concentric rings, in which case the spirals would be arranged the one within the other.

Having now particularly described and ascertained the nature of our said invention and in what manner the same is to be performed, we declare that what we claim is:—

In the process of producing a kinematographic film, the exposure of a slow acting light sensitive film to the reduced images of an ordinary kinematographic series as photographed from life on an ordinary quick acting light sensitive film, whereby a reduced image containing substantially all the details of the latter is secured, substantially as and for the purpose described.

In testimony whereof we have signed our names to this specification in the presence of two subscribing witnesses.

BESSIE KATE BROWN.
THEODORE BROWN.

Witnesses:
GILBERT FLETCHER TYSON,
WILLIAM GERALD REYNOLDS.